United States Patent
Vaidyanathan et al.

(10) Patent No.: US 9,188,996 B2
(45) Date of Patent: Nov. 17, 2015

(54) SYSTEM AND METHOD FOR CONTROLLING COMPUTER SYSTEM FAN SPEED

(75) Inventors: Kalyanaraman Vaidyanathan, San Diego, CA (US); Kenny C. Gross, San Diego, CA (US); David John Belanger, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 1541 days.

(21) Appl. No.: 12/553,571

(22) Filed: Sep. 3, 2009

(65) Prior Publication Data

US 2011/0054705 A1 Mar. 3, 2011

(51) Int. Cl.
*G06F 19/00* (2011.01)
*G05D 23/19* (2006.01)
*G06F 1/20* (2006.01)

(52) U.S. Cl.
CPC ............ *G05D 23/1931* (2013.01); *G06F 1/206* (2013.01); *Y02B 60/1275* (2013.01)

(58) Field of Classification Search
USPC ......... 700/25, 79, 248, 299, 300; 361/679.14, 361/679.18; 702/130, 99; 29/248
See application file for complete search history.

(56) References Cited

U.S. PATENT DOCUMENTS

| | | | | |
|---|---|---|---|---|
| 5,457,766 | A * | 10/1995 | Ko | 388/831 |
| 6,526,333 | B1 * | 2/2003 | Henderson et al. | 700/300 |
| 6,601,168 | B1 * | 7/2003 | Stancil et al. | 713/100 |
| 6,791,836 | B2 * | 9/2004 | Cipolla et al. | 361/679.48 |
| 6,826,456 | B1 * | 11/2004 | Irving et al. | 700/299 |
| 6,876,164 | B2 * | 4/2005 | Liu | 318/434 |
| 7,020,802 | B2 | 3/2006 | Gross et al. | |
| 7,139,169 | B2 * | 11/2006 | Alperin et al. | 361/679.4 |
| 7,190,142 | B2 * | 3/2007 | Ha | 318/599 |
| 7,248,980 | B1 | 7/2007 | Gross et al. | |
| 7,583,043 | B2 * | 9/2009 | Chung et al. | 318/634 |
| 7,612,508 | B2 * | 11/2009 | Jreij et al. | 318/268 |
| 7,661,316 | B2 * | 2/2010 | Gross et al. | 73/660 |
| 2007/0297893 | A1 * | 12/2007 | Alon et al. | 415/47 |

\* cited by examiner

*Primary Examiner* — Kidest Bahta
(74) *Attorney, Agent, or Firm* — Brooks Kushman P.C.

(57) ABSTRACT

Computer system fans having fixed operating states corresponding to discreet operating speeds may be controlled by collecting temperature information upstream or downstream of the fans and commanding the fans to switch between the fixed operating states based on the temperature information at a frequency sufficient to controllably achieve speeds between the discreet operating speeds.

19 Claims, 4 Drawing Sheets

SYSTEM AND METHOD FOR CONTROLLING COMPUTER SYSTEM FAN SPEED

BACKGROUND

Energy costs to cool modern computer server systems may be substantial. In many cases, these energy costs may be greater than the cost of the server systems themselves.

SUMMARY

A computer server may include a plurality of fans having fixed operating states corresponding to discreet operating speeds, a telemetry module configured to collect temperature information about the computer server, and a controller configured to issue control commands to the fans based on the temperature information such that the fans controllably achieve operating speeds between the discreet operating speeds.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
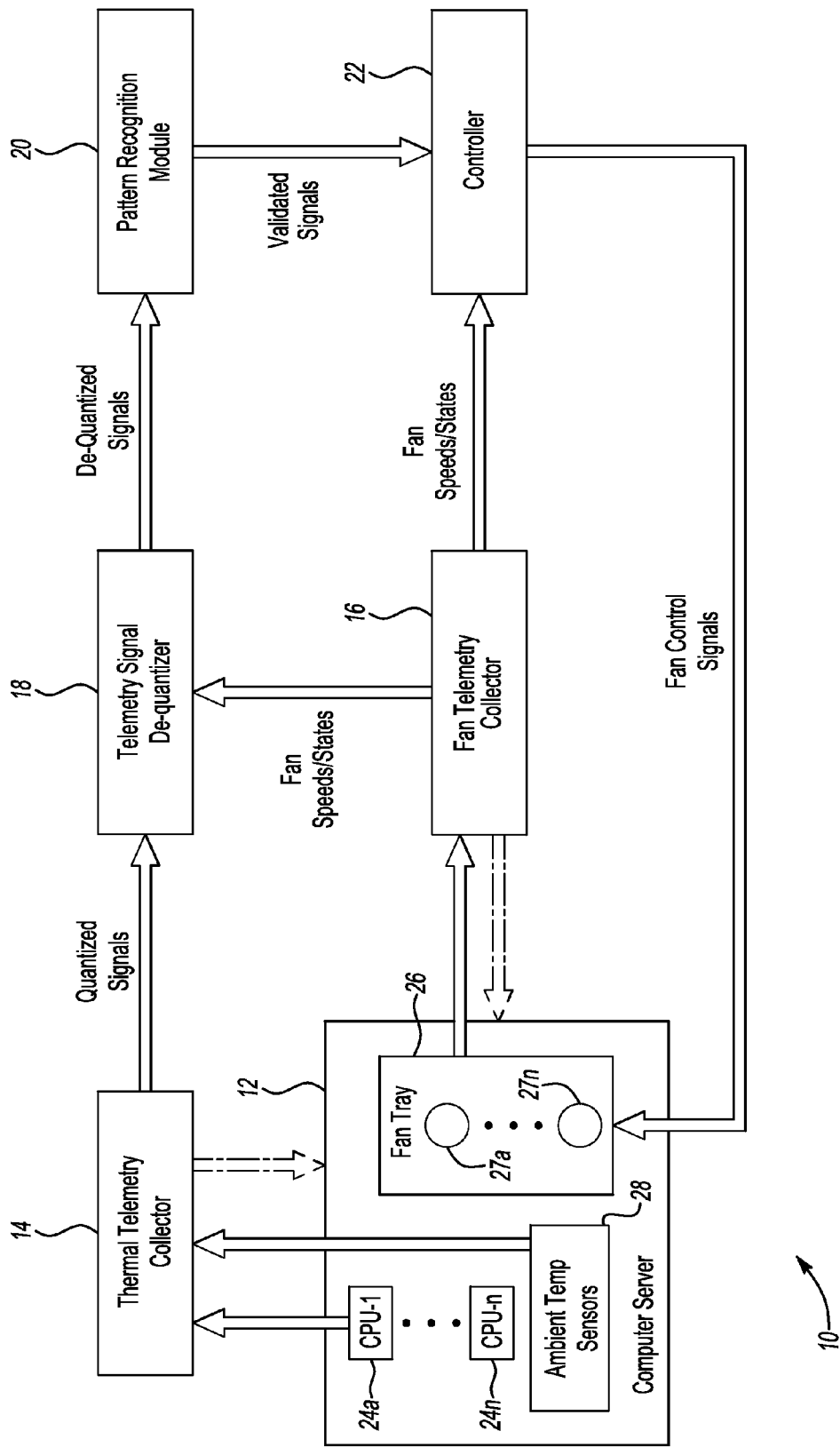
FIG. 1 is a block diagram of an embodiment of a computer server system.

The fan control algorithms in certain computing platforms (including those with variable-speed fans) are set with high nominal fan speeds. That is, these speeds provide adequate chip thermal margins and DIMM thermal budgets for theoretical servers at, for example, an altitude of 10,000 ft (where the air is thinner and less effective at cooling), with datacenters near the top of their allowed ambient temperature range, and running at 100% load with a full CPU/memory configuration. For most servers, this nominal fan speed is greater than necessary resulting in significant energy waste. (The energy consumed by a fan motor is proportional to the cubic power of its RPMs.)

Computing platform variable-speed fans subject to feedback-control based on computing platform telemetry signals may be dynamically controlled to optimize energy utilization, taking into account altitude and/or dynamic variations in datacenter ambient temperatures and CPU/Memory/IO load variations. For example, a computer system temperature, ambient temperature, and fan speed may be monitored. Next, a validated ambient temperature and validated computer system temperature may be computed based on parameters including the monitored temperatures. Then, a control signal may be generated and sent to a fan in response to the validated temperatures and monitored fan speed to assure fan speed stability. More specifically, a thermal telemetry monitor may receive time-series information regarding processor temperature and ambient temperature, and a fan telemetry monitor may receive time-series information regarding fan speed. A pattern-recognition mechanism may generate validated processor and ambient temperatures using known pattern-recognition techniques based on the time-series information. A controller may then command a fan to increase or decrease its speed to optimize cooling of the computer system.

Computing platform (including power supply unit) variable-speed fans having fixed operating states via software or computing platform (including power supply unit) fixed-speed fans having fixed operating states via hardware may not be controlled in the manner described above as such fans (i.e., fixed operating state fans) cannot be commanded to smoothly and continuously increase or decrease their speeds to optimize cooling. Rather, they may be merely turned "on" or "off," or set at some predefined speed.

Pulse width modulation (PWM) based algorithms may be used to control fixed operating state fans such that they achieve variable speeds to optimize cooling and potentially minimize power consumption. (PWM uses a square wave whose duty cycle is modulated to control the average value of the waveform.) Switching, for example, between two fixed speeds (e.g., "high" and "low") with sufficient frequency may permit speeds anywhere between "high" and "low" to be achieved.

In certain embodiments, the 0 and 1 states of the PWM signals correspond to any two selected fan speed levels (e.g., "off/low," "off/high," "low/high," etc.) By modulating the switching frequency between the 0 and 1 states, and doing so at a frequency sufficient to permit the system thermal inertia to smooth temperature variations, we have demonstrated that any desired intermediate fan speed can be obtained even with fixed operating state fans. As discussed below, these PWM techniques may be combined with continuous system telemetry for feedback/control and sensor operability validation.

By minimizing fan speed (and thus fan power) for a particular set of circumstances, acoustical and vibrational effects may be improved. Acoustic energy in the range irritating to humans, for example, increases with the 5th power of fan RPM. Additionally, these PWM techniques may save more energy than other power management approaches that, for example, throttle CPU clock rates when loads are low.

Referring to FIG. 1, an embodiment of a computer server system 10 may include a computer sever 12, thermal and fan speed telemetry collectors 14, 16, telemetry signal de-quantizer 18, pattern recognition module 20, and controller 22. The server 12 may include a plurality of CPUs 24a-24n, fan tray 26 and ambient temperature sensors 28. The fan tray 26 of FIG. 1 includes a plurality of fans 27a-27n that have two or more fixed operating states (e.g., "on," "off," "high," "low," etc.)

The thermal telemetry collector 14 collects quantized temperature information from the CPUs 24a-24n and ambient temperature sensors 28 in a known fashion. The fan speed telemetry collector 16 collects quantized fan speed information (in RPMs for example) and/or fan operating state information (e.g., "low," "high," "off," "on," etc.) from the fan tray 26 in a known fashion. As an example, the thermal and fan speed telemetry collectors 14, 16 may be configured and operated as described in U.S. Pat. No. 7,020,802 to Gross et al. During operation, the collectors 14, 16 may periodically measure temperature, fan speed and/or fan operating state information while the server 12 operates. The collectors 14, 16 may then record the values on a data storage device keeping track of temporal relationships between events in the information collected.

As known in the art, modern server computer systems, such as the server 12, are typically equipped with a significant number of sensors that monitor signals during the operation of the computer systems. Results from this monitoring process can be used to generate time series data for these signals (which can be collected as described above) and subsequently analyzed to determine how the computer system is operating. One application of this time series data is for purposes of proactive fault monitoring to identify leading indicators of component or system failures before the failures actually occur.

Many computer systems, including the server 12 in this example, use low-resolution eight-bit analog-to-digital (A/D) converters in all of their physical sensors to sample the signals. This causes readings of physical variables such as voltage, current, temperature and fan speed to be highly quantized. Hence, the sampled signal values from these sensors can only assume discrete values, and no readings can be reported between these discrete values. For example, temperatures from the CPUs 24a-24n may be quantized to the nearest degree. If the true temperature is 32.4° C., it can only be reported as one of the quantized values 32° C. or 33° C.

These quantization effects may present issues for proactive fault monitoring. Normally, one can apply statistical pattern recognition techniques to continuous signal values to detect if the signals start to drift away from steady-state values at a very early stage of system degradation. With significant quantization, however, conventional statistical pattern recognition techniques may not effectively detect the onset of subtle anomalies that might precede component or system failures.

"Burst sampling" may be used to overcome the drawbacks of low-resolution quantized signals. This technique restores high-resolution signals from low-resolution A/D converter outputs by removing the quantization effects. Specifically, a large "burst" of samples (typically hundreds of samples) are retrieved from low-level hardware registers of the server computer system being monitored. These samples are then collected through telemetry channels at the highest data rate that the hardware channels can support (typically at kHz rates). Next, the samples in the "burst" are averaged to obtain values that approximate signals sampled with high-resolution data-acquisition capability. This technique, however, can be used only for a small subset of signals of interest in a large system because the burst sampling creates a large burst demand for the bandwidth that is available for delivering telemetry samples via the system bus. In some large systems, over 1000 telemetry signals are monitored concurrently. The burst sampling technique can consume the entire system bus bandwidth while delivering only a few tens of these signals.

To address the issues discussed above associated with quantized telemetry information and the burst sampling technique, the telemetry signal de-quantizer 18 may use techniques described in U.S. Pat. No. 7,248,980 to Gross et al. to de-quantize the telemetry information received from the collectors 14, 16. That is, the de-quantizer 18 may reconstruct high-resolution temperature and fan speed signals from a set of low-resolution quantized samples collected by the thermal and fan speed telemetry collectors 14, 16. During operation, the de-quantizer 18 may receive a time series containing low-resolution quantized signal values (representing, for example, CPU temperatures, ambient temperatures, fan speeds, etc.) which are sampled from the high-resolution signal. Next, the de-quantizer 18 may perform a spectral analysis on the time series to obtain a frequency series for the low-resolution quantized signal values. The de-quantizer 18 may next select a subset of frequency terms from the frequency series which have the largest amplitudes. The de-quantizer 18 may then reconstruct the high-resolution temperature and fans speed signals by performing an inverse spectral analysis on the subset of the frequency terms.

In other embodiments, quantized signals may be used as input to the control algorithms described herein. As apparent to those of ordinary skill, however, these quantized signals may result in suboptimal fan energy management and confound assessments of sensor integrity as discussed above.

The pattern recognition module 20 analyzes the de-quantized temperature and fan speed signals from the de-quantizer 18 to validate the integrity of the signals received. That is, the module 20 validates the integrity of the sensors used to gather the temperature and/or fan speed information. For example, the module 20 may use known nonlinear, nonparametric regression techniques to detect sensor drift or other sensor anomalies by examining correlation patterns between and among the telemetry variables. Signals found to be uncharacteristic or otherwise anomalous may be discarded.

The validation process described above may protect the system 10 from faulty sensor readings and/or oscillations from hysteretic phenomena. In the absence of such a step, the server 12 may be over or under-cooled if the sensors begin to drift or otherwise degrade.

Validated signals from the pattern recognition module 20 are received by the controller 22. In the embodiment of FIG. 1, the controller 22 is a multiple-input, multiple-output (MIMO) controller. Any suitable controller, however, may be used. The controller 22 may issue commands to the fan tray 26 to optimally adjust fan speeds in a manner that, for example, matches the degree of cooling to the net temperature difference between chip junction temperatures and ambient temperatures.

In certain embodiments, a "comfort band" or desired range of temperatures for the server 12 may be specified within the controller 22. The controller 22 may then control the fan tray 26 to keep the temperatures inside the server 12 within this range. If the temperatures drop below this comfort band, the controller 22 may command the fans 27a-27n to slow down. If the temperatures rise above the comfort band, the controller 22 may command the fans 27a-27n to speed up.

As an example, a desired temperature range of 81° C. to 84° C. for the server 12 may be set within the controller 22. Periodically (every minute for example), the controller 22 may examine the validated temperature information from the module 20 to determine if it falls within the desired range. If the temperature information indicates that it is below the desired range, the controller 22 may decrease the current fan speeds (by appropriately altering the PWM signal to the fans 27a-27n) by a fixed amount (e.g., 10%) or proportionally to the difference between the temperature information and the desired range. Of course, other schemes may also be used. If the temperature information indicates that it is above the desired range, the controller 22 may increase the current fan speeds (again by appropriately altering the PWM signal to the fans 27a-27n) by a fixed or proportional amount. Iteratively following this procedure will permit the controller 22 to find the fan speeds that keep the server temperature within the comfort band and optimize energy consumption.

In other embodiments, a comfort band and/or limits on the desired rates of change of server temperatures, etc. may also be used to tailor the behavior of the controller 22 to any particular set of circumstances.

Figure 2:
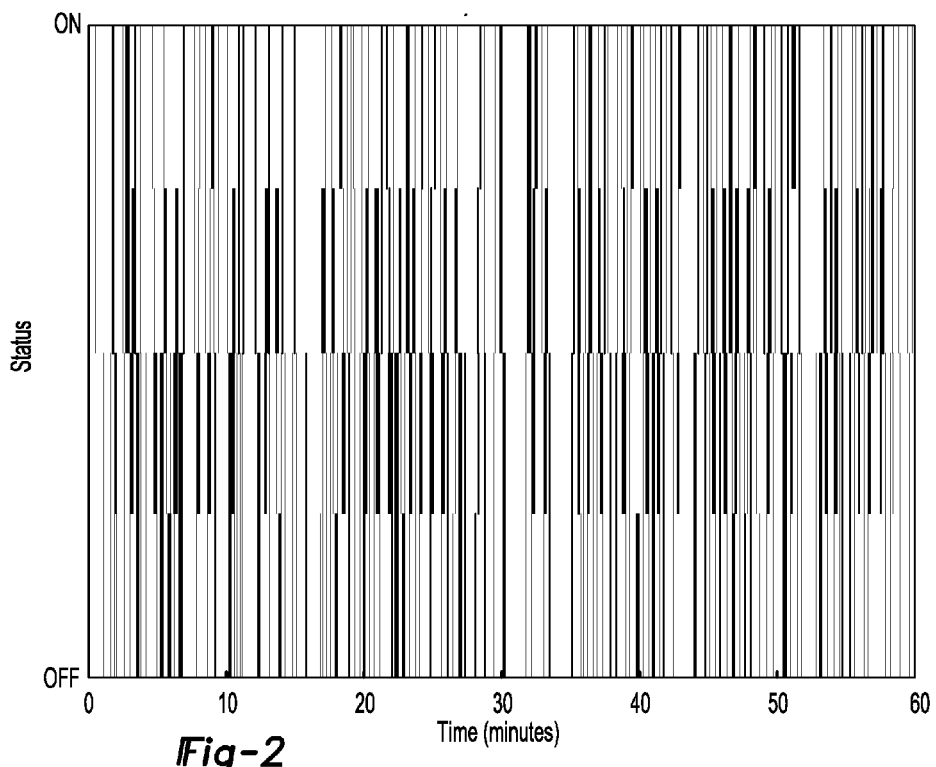
FIG. 2 is an example plot of fan status (raw data) versus time for the fans of FIG. 1.
Figure 3:
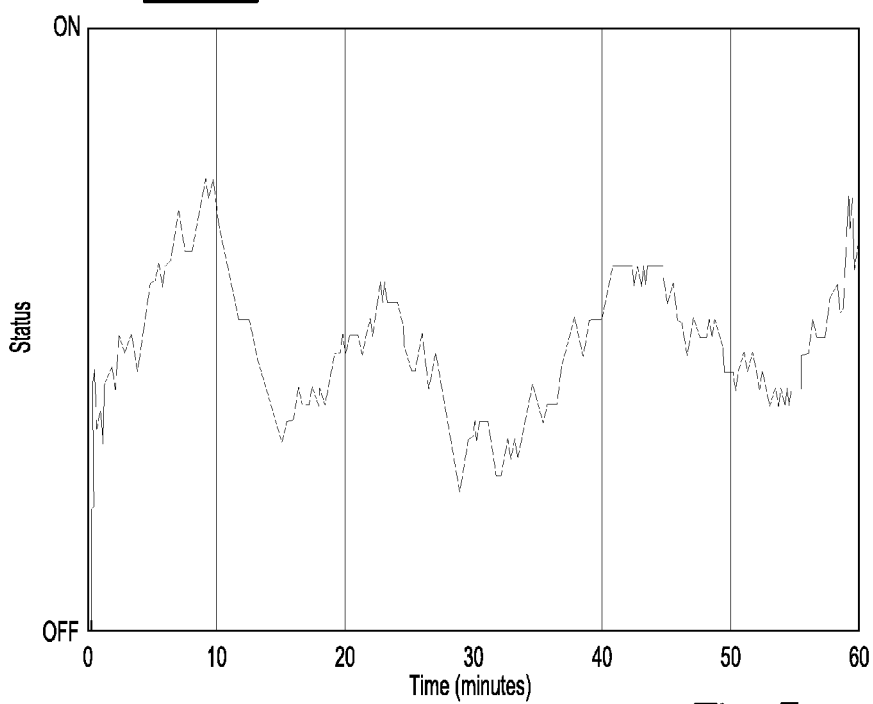
FIG. 3 is an example plot of fan status (smoothed data) versus time for the fans of FIG. 1.

Referring to FIGS. 2 and 3, an example set of raw and smooth data representing the frequency at which the fans 27a-27n of FIG. 1 are switched "on" and "off" is plotted over a 60 minute period. As apparent from FIG. 3, the fan speeds are controllable between the "on" and "off" positions.

Figure 4:
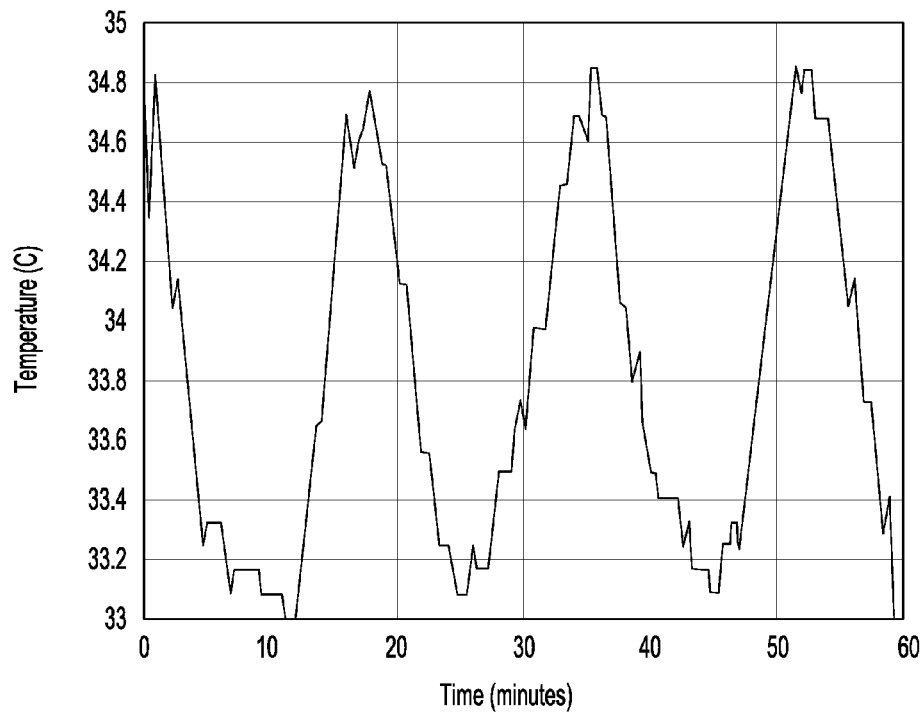
FIGS. 4 and 5 are example plots of temperature versus time at different locations within the server of FIG. 1.
Figure 5:
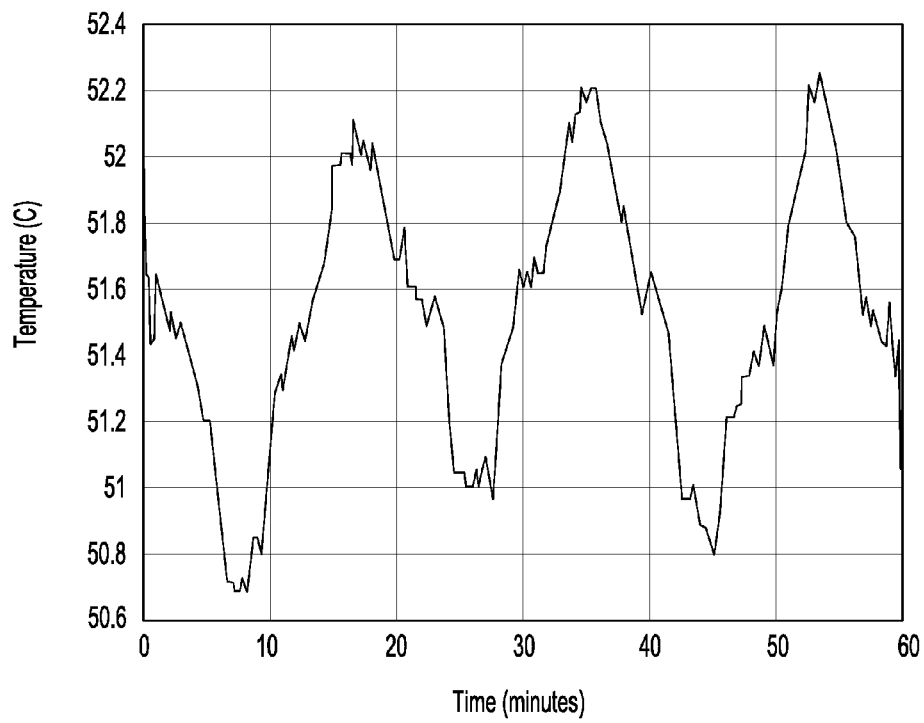

Referring to FIGS. 4 and 5, temperature data at two different locations within the server 12 of FIG. 1 is plotted during the same 60 minute period as in FIGS. 2 and 3. As apparent from these figures, the temperatures can be controlled so as to exhibit any desired profile/behavior.

Figure 6:
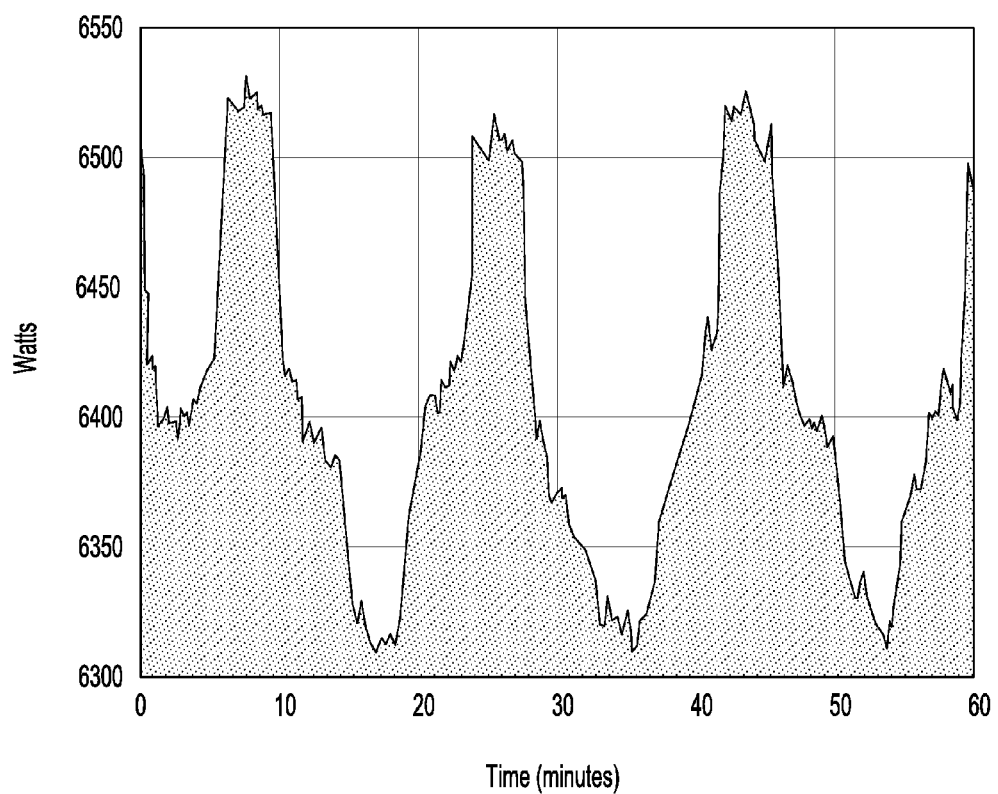
FIG. 6 is an example plot of power consumption versus time for the fans of FIG. 1.

Referring to FIG. 6, the power consumed by the server 12 of FIG. 1 is plotted during the same 60 minute period as in FIGS. 2 through 5. The power consumption appears to be greatest when the temperatures of FIGS. 4 and 5 are around their minimums (when the fans are working the hardest.)

As apparent to those of ordinary skill, the algorithms disclosed herein may be deliverable to a processing device in many forms including, but not limited to, (i) information permanently stored on non-writable storage media such as ROM devices and (ii) information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed is:

1. A computer server system comprising:
   a computer server including a plurality of fans having fixed operating states corresponding to discreet operating speeds;
   a telemetry module configured to collect temperature information about the computer server; and
   a controller configured to issue control commands to the fans based on the temperature information such that the fans controllably achieve operating speeds between the discreet operating speeds.

2. The system of claim 1, wherein the temperature information is quantized temperature information, further comprising a de-quantizer module in communication with the telemetry module and configured to de-quantize the quantized temperature information received from the telemetry module.

3. The system of claim 2 further comprising a pattern recognition module in communication with the de-quantizer module and configured to detect anomalies within the de-quantized temperature information received from the de-quantizer module.

4. The system of claim 3 wherein the pattern recognition module is further configured to discard anomalous temperature information.

5. The system of claim 1 wherein the control commands include pulse width modulated control commands.

6. The system of claim 1 further comprising another telemetry module configured to collect speed information about the fans.

7. The system of claim 6 wherein the control commands are further based on the speed information.

8. The system of claim 1 further comprising another telemetry module configured to collect operating state information about the fans.

9. The system of claim 8 wherein the control command are further based on the operating state information.

10. A control system for computer system fans having fixed operating states corresponding to discreet operating speeds, the system comprising:
    a telemetry module configured to collect quantized temperature information at least one of upstream and downstream of the fans;
    a de-quantizer module in communication with the telemetry module and configured to de-quantize the quantized temperature information;
    a pattern recognition module in communication with the de-quantizer module and configured to detect anomalies within the de-quantized temperature information to validate the de-quantized temperature information; and
    a controller in communication with the pattern recognition module and configured to command the fans to switch between the fixed operating states based on the validated de-quantized temperature information at a frequency sufficient to controllably achieve speeds between the discreet operating speeds.

11. The system of claim 10 wherein the pattern recognition module is further configured to discard anomalous temperature information.

12. The system of claim 10 further comprising another telemetry module configured to collect speed information about the fans.

13. The system of claim 12 wherein the controller is further configured to command the fans to switch between the fixed operating states based on the speed information.

14. The system of claim 10 further comprising another telemetry module configured to collect operating state information about the fans.

15. The system of claim 14 wherein the controller is further configured to command the fans to switch between the fixed operating states based on the operating state information.

16. A method for controlling computer system fans having fixed operating states corresponding to discreet operating speeds, the method comprising:
    collecting temperature information at least one of upstream and downstream of the fans;
    detecting anomalies in the temperature information;
    discarding the anomalies to validate the temperature information; and
    commanding the fans to switch between the fixed operating states based on the validated temperature information at a frequency sufficient to controllably achieve speeds between the discreet operating speeds.

17. The method of claim 16, wherein the temperature information is quantized temperature information, further comprising de-quantizing the quantized temperature information.

18. The method of claim 16 further comprising collecting speed information about the fans, wherein the fans are commanded to switch between the fixed operating states further based on the speed information.

19. The method of claim 16 further comprising collecting operating state information about the fans, wherein the fans are commanded to switch between the fixed operating states further based on the operating state information.

* * * * *